(12) United States Patent
Kakimoto et al.

(10) Patent No.: US 8,561,750 B2
(45) Date of Patent: Oct. 22, 2013

(54) CHAIN GUIDE DEVICE

(75) Inventors: Takaya Kakimoto, Saitama (JP); Mikio Uchiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 277 days.

(21) Appl. No.: 13/028,713

(22) Filed: Feb. 16, 2011

(65) Prior Publication Data

US 2011/0203867 A1    Aug. 25, 2011

(30) Foreign Application Priority Data

Feb. 19, 2010 (JP) ................................. 2010-035101

(51) Int. Cl.
*F16H 7/18* (2006.01)

(52) U.S. Cl.
USPC ............................. 180/357; 474/140; 474/144

(58) Field of Classification Search
USPC ................. 180/231, 350, 351, 352, 357, 358; 474/111, 140, 144, 151; D12/127
See application file for complete search history.

(56) References Cited

U.S. PATENT DOCUMENTS

| | | | | |
|---|---|---|---|---|
| 4,471,851 A | * | 9/1984 | Kamiya et al. | 180/219 |
| 5,679,084 A | * | 10/1997 | Daniels, III | 474/140 |
| D532,720 S | * | 11/2006 | McGarry | D12/127 |
| D600,600 S | * | 9/2009 | McGarry | D12/127 |
| D601,465 S | * | 10/2009 | McGarry | D12/127 |
| 7,691,019 B2 | * | 4/2010 | Gogo | 474/140 |
| 7,708,662 B2 | * | 5/2010 | Uchiyama et al. | 474/144 |
| 7,740,554 B2 | * | 6/2010 | McGarry | 474/144 |
| 7,771,303 B2 | * | 8/2010 | Fuse et al. | 474/144 |
| 2005/0159260 A1 | * | 7/2005 | Gogo | 474/111 |
| 2007/0032324 A1 | * | 2/2007 | Uchiyama et al. | 474/140 |
| 2007/0042847 A1 | * | 2/2007 | Fuse et al. | 474/140 |
| 2007/0087877 A1 | * | 4/2007 | McGarry | 474/144 |
| 2008/0227573 A1 | * | 9/2008 | Strombeck et al. | 474/144 |
| 2010/0234154 A1 | * | 9/2010 | Klieber | 474/80 |

FOREIGN PATENT DOCUMENTS

JP      2006-096215 A     4/2006

* cited by examiner

*Primary Examiner* — Paul N Dickson
*Assistant Examiner* — Barry Gooden, Jr.
(74) *Attorney, Agent, or Firm* — Birch, Stewart, Kolasch & Birch, LLP

(57) ABSTRACT

A chain guide device wherein it is unnecessary to make a chain guide body a thick and heavy member to enhance the productivity of the chain guide body. The chain guide body is split into a left guide half having a left-side upper split surface and a left-side lower split surface which are formed along a longitudinal direction of a chain and a right guide half having a right-side upper split surface and a right-side lower split surface. The guide bodies, which are roughly U-shaped, can be easily demolded after injection molding to enhance productivity. The contact of the chain with the split surfaces is lessened, as compared with the case where split surfaces are inclined at an angle relative to the longitudinal direction of the chain. Accordingly, wearing of the split surfaces is restrained, and it is unnecessary to make the chain guide body greater in thickness and weight.

20 Claims, 14 Drawing Sheets

CHAIN GUIDE DEVICE

CROSS-REFERENCE TO RELATED APPLICATIONS

The present application claims priority under 35 USC 119 to Japanese Patent Application No. 2010-035101 filed on Feb. 19, 2010 the entire contents of which are hereby incorporated by reference.

BACKGROUND OF THE INVENTION

1. Field of the Invention

The present invention relates to a chain guide device provided in a chain drive type vehicle wherein a wheel is rotated through a power transmitting action of an endless chain wrapped around a drive sprocket provided in a driving force generating device and a driven sprocket provided on the wheel.

2. Description of Background Art

In a chain drive type vehicle, attendant on the lapse of operation time, the wearing of pins and bushes in a roller chain proceeds, whereby the overall length of the roller chain is elongated. Due to the elongation, the roller chain may become loose to the lower side. Therefore, a device for supporting the roller chain is needed.

Conventionally, as a device for guiding the roller chain in a chain drive type vehicle, a variety of chain guide devices have been proposed. See, for example, Japanese Patent Laid-open No. 2006-096215 (FIGS. 2 and 4).

As shown in FIG. 2 of Japanese Patent Laid-open No. 2006-096215, a chain guide device (30) (the parenthesized symbols are those used in Japanese Patent Laid-open No. 2006-096215, here and hereafter) includes a mounting stay (hereinafter referred to "support stay") (41) mounted to a lower surface (26a) of a rear swing arm (26) constituting a part of a body frame, a chain guide bracket (42) attached to the support stay (41) through a bolt (44), and a chain guide (hereinafter referred to as "chain guide body") (43) assembled onto the chain guide bracket (42).

In addition, as shown in FIG. 4 of Japanese Patent Laid-open No. 2006-096215, a fitting part (46) of the chain guide body (43) is fitted in a fitting hole (45), and the chain guide bracket (42) is clamped between a flange part (48) at the front end of the fitting part (46) and a projection (49) at the rear end of the fitting part (46). Consequently, the chain guide body (43) is assembled onto the chain guide bracket (42) assuredly.

Meanwhile, the chain guide body (43) must be made narrower when assembled onto the chain guide bracket (42). Therefore, an elastic material being soft or flexible must be used to form the chain guide body (43). Then, since the elastic material is susceptible to wearing, it is necessary to form the chain guide body (43) as a thick and heavy member. In addition, a complicated mold is needed for forming the chain guide body (43), which leads to poor productivity.

Thus, there is a need for a chain guide device wherein it is unnecessary to make a chain guide body a thick and heavy member. Thus, the productivity of the chain guide body can be enhanced.

SUMMARY AND OBJECTS OF THE INVENTION

It is an object of an embodiment of the present invention to provide a chain guide device wherein it is unnecessary to make a chain guide body a thick and heavy member. Thus, the productivity of a chain guide body can be enhanced.

According to an embodiment of the present invention, a chain guide device is provided in a chain drive type vehicle including a driving force generating device provided on a main frame constituting a vehicle body. A drive sprocket is provided in the driving force generating device with a swing arm mounted to the main frame in a vertically swingable manner. A wheel is provided on the swing arm in a rotatable manner with a driven sprocket provided on the wheel and an endless chain wrapped around the driven sprocket and the drive sprocket. Thus, the wheel is rotated through a power transmitting action of the endless chain. The chain guide device includes an annular chain guide body for guiding the endless chain while surrounding a part in the longitudinal direction of the endless chain. A chain guide bracket is provided in the swing arm for holding the chain guide body. The chain guide body is split into a left guide half and a right guide half which have split surfaces along the longitudinal direction of the endless chain.

According to an embodiment of the present invention, the chain guide body includes an upper wall, a lower wall, a left side wall and a right side wall with the split surfaces are provided in the upper wall and the lower wall. The split surfaces of the upper wall and the lower wall are provided with positioning parts including projections and recesses.

According to an embodiment of the present invention, the upper wall and the lower wall of the chain guide body respectively include split parts formed along the longitudinal direction of the endless chain. The positioning part, provided at the split surfaces of the lower wall, is provided at rear portions of the split parts of the lower wall on the outlet side of the endless chain.

According to an embodiment of the present invention, the upper wall and the lower wall of the chain guide body respectively include split parts formed along the longitudinal direction of the endless chain with the length of the split parts of the lower wall in the longitudinal direction being set to be greater than the length of the split parts of the upper wall in the longitudinal direction.

According to an embodiment of the present invention, the chain guide bracket is formed to be U-shaped in section so as to cover an outside surface of the chain guide body while being mounted to the swing arm through support stays. The left and right guide halves are respectively provided at their front edges with flanges coming into contact with the front end of the chain guide bracket from the front side. The left and right guide halves are respectively provided at their upper portions with lock pieces engaged with one part of the support stay. The chain guide body is held by fixing the chain guide bracket to the support stays in the condition where the flanges are in contact with the chain guide bracket and where the lock pieces are pressed by the one part of the support stay.

According to an embodiment of the present invention, the side walls of the guide halves are provided with lightening windows includes slots elongated in the longitudinal direction of the endless chain, and reinforcing beams are so provided as to bridgingly interconnect upper and lower edges of the lightening windows. The reinforcing beams are provided between the positioning part for the upper wall and the positioning part for the lower wall, and are disposed on a line interconnecting the positioning part for the upper wall and the positioning part for the lower wall, in side view.

According to an embodiment of the present invention, the positioning part for the upper wall is provided at lock piece base parts formed in a thick form in the upper wall.

According to an embodiment of the present invention, the positioning part for the lower wall is formed so that the lower end of the recess is opened to the lower side of the lower wall, the projection is formed at the position of a bottom wall surface of the lower wall, and a lower surface of the projection is exposed from the recess when the left and right guide halves are put in contact with each other.

According to an embodiment of the present invention, the endless chain includes left and right roller link plates provided on the left and right sides of rollers, interconnecting the rollers, and rotatably supporting the rollers. The split surfaces of the left and right guide halves are disposed between the left and right roller link plates when the endless chain is passed through the chain guide body.

According to an embodiment of the present invention, the width between an inner wall surface of the left side wall and an inner wall surface of the right side wall is set so that, when the endless chain is put in contact with the inner wall surface of the side wall of the chain guide body, the other side of the roller link plates is located astride the split surfaces.

According to an embodiment of the present invention, the outer side surfaces of the guide halves are provided with lightening hole parts recessed in the direction opposite to the projecting direction of the projections and the recessing direction of the recesses.

According to an embodiment of the present invention, the chain guide body includes a wear indicator for confirming wear of the lower wall; the wear indicator includes a hollow provided in the range from the outer side surface to an outer lower surface of the lower wall and caving in to the inside of the lower wall, and a step disposed in the hollow and being parallel to the upper surface of the lower wall, and ensures that the timing for replacement of the chain guide body can be visually confirmed when the endless chain reaches the step due to wear. The positioning part for the lower wall is provided on the lower side relative to the step.

According to an embodiment of the present invention, the weight of the left guide half is equal to the weight of the right guide half, and the left and right guide halves are simultaneously molded using a single mold.

According to an embodiment of the present invention, the width of the recesses of the positioning parts in the front-rear direction is set to be greater than the width of the projections of the positioning parts in the front-rear direction, whereby either the left guide half or the right guide half can be slid in the front-rear direction.

According to an embodiment of the present invention, the annular chain guide body guides the endless chain while surrounding a part in the longitudinal direction of the endless chain, and is split into the left guide half and the right guide half which have split surfaces along the longitudinal direction of the endless chain. Therefore, the left guide half and the right guide half are roughly U-shaped in cross section. The roughly U-shaped guide halves can be easily demolded after injection molding, so that productivity is enhanced.

Further, the split surfaces of the left guide half and the right guide half are along the longitudinal direction of the endless chain. In other words, the split surfaces are parallel to the longitudinal direction of the endless chain. This ensures that contact of the endless chain and the split surfaces is lessened, as compared with the case where the split surfaces are disposed at an angle relative to the longitudinal direction of the endless chain. Therefore, wearing of the split surfaces is restrained and, accordingly, it is unnecessary to make the chain guide body a thick and heavy member. In addition, it is unnecessary to elastically deform the chain guide body at the time of assembling the chain guide body onto the chain guide bracket and, accordingly, an elastic body which is high in durability and hard can be used. Thus, according to an embodiment of the present invention, it is possible to provide a chain guide device such that it is unnecessary to make a chain guide body a thick and heavy member to enhance the productivity of the chain guide body.

The roughly U-shaped guide halves are simple in structure, which ensures that the guide halves can be easily molded from a high-strength resin material which is generally poor in fluidity when melted.

According to an embodiment of the present invention, the split surfaces of the upper wall and the lower wall of the chain guide body are provided with the positioning parts includes projections and recesses. This facilitates the operation of assembling the left guide half and the right guide half into position.

According to an embodiment of the present invention, the positioning part provided at the split surfaces of the lower wall is provided at rear portions of the split parts of the lower wall on the outlet side of the endless chain. Thus, the position of the positioning part for the lower wall is located on the outlet side opposite to the inlet side of the endless chain on which wearing is more liable to occur. Consequently, the positioning part for the lower wall can be protected.

According to an embodiment of the present invention, the length of the split parts of the lower wall in the longitudinal direction is set to be greater than the length of the split parts of the upper wall in the longitudinal direction. This ensures that the endless chain can be effectively guided by the lower wall.

According to an embodiment of the present invention, the chain guide body is held by fixing the chain guide bracket to the support stays in the condition where the flanges are in contact with the chain guide bracket and where the lock pieces are pressed by the one part of the support stay. Therefore, the chain guide body can be prevented from being disengaged from the chain guide bracket in the vehicle front-rear direction, which is parallel to the longitudinal direction of the endless chain.

According to an embodiment of the present invention, the reinforcing beams bridgingly interconnect upper and lower edges of the lightening windows provided in the side walls of the guide halves, and are provided between the positioning part for the upper wall and the positioning part for the lower wall, and are disposed on a line interconnecting the positioning part for the upper wall and the positioning part for the lower wall, in a side view. This enhances the rigidity of the guide halves. Therefore, even in the case where a holding force of the lock piece is lowered due to the movement of the lock piece according to tolerances generated at the time of forming the left and right guide halves, after assembly of the chain guide device onto the support stays, the assembled state of the chain guide body can be maintained while securing the rigidity between the left and right guide halves by the positioning part reinforced by the reinforcing beam.

According to an embodiment of the present invention, the positioning part for the upper wall is provided at lock piece base parts formed in a thick form in the upper wall. This ensures that the rigidity of the positioning part for the upper wall can be enhanced. Thus, the rigidity of the chain guide body can be secured.

According to an embodiment of the present invention, the positioning part for the lower wall is formed so that the lower end of the recess is opened to the lower side of the lower wall, the projection is formed at the position of a bottom wall surface of the lower wall, and a lower surface of the projection is exposed from the recess when the left and right guide halves are put in contact with each other. Therefore, the left and right guide halves can be easily put into contact with each other at the time of assembling the left guide half and the right guide half into position. In addition, since the positioning part for the lower wall is formed so that the recess is opened to the lower side of the lower wall and the projection is formed at the position of the bottom wall surface of the lower wall, the positioning part is spaced the most from that upper surface of the lower wall which is worn by passage thereon of the endless chain.

According to an embodiment of the present invention, the split surfaces of the left and right guide halves are disposed between the left and right roller link plates when the endless chain is passed through the chain guide body. This ensures that, when the upper wall or the lower wall is worn by the endless chain, the roller link plates do not make contact with the split surfaces, so that wearing of the split surfaces is restrained.

In addition, as the wearing proceeds, the lower walls of the left and right guide halves or the upper walls of the left and right guide halves are ground, grooves are formed in left and right portions of the lower walls or in left and right portions of the upper walls along the longitudinal direction of the endless chain, and guide parts in a projected form with the split surfaces as a center is formed between the left and right grooves in the lower surfaces or between the left and right grooves formed in the upper wall and along the longitudinal direction of the endless chain. Therefore, the rollers pass on the guide parts, whereby movement of the endless chain is restricted. Accordingly, wearing of the upper wall, the lower wall, the left side wall and the right side wall of the chain guide body is restrained.

According to an embodiment of the present invention, the width between the inner wall surface of the left side wall and the inner wall surface of the right side wall is set so that, when the endless chain is put in contact with the inner wall surface of the side wall of the guide body, the other side of the roller link plates is located astride the split surfaces. Therefore, a structure in which the roller link plates do not make contact with the split surfaces can be realized.

According to an embodiment of the present invention, the outer surfaces of the guide halves are provided with the lightening hole parts recessed in the direction opposite to the projecting direction of the projections and the recessing direction of the recesses. Therefore, in the guide half on one side, the recessing direction of the lightening hole part coincides with the projecting direction of the projection, and in the guide half on the other side, the recessing direction of the lightening hole part coincides with the direction opposite to the recessing direction of the recess. The left guide half and the right guide half can be simultaneously injection molded by arranging the guide halves in the same orientation. Therefore, the demolding direction after injection molding is the same for both the guide halves, so that molding of the guide halves is facilitated.

According to an embodiment of the present invention, the wear indicator ensures that the timing for replacement of the chain guide body can be visually confirmed when the endless chain reaches the step due to wear. In addition, the positioning part for the lower wall is provided on the lower side relative to the step. Therefore, the timing for replacement of the chain guide body can be visually confirmed easily before the wear of the lower wall of the chain guide body reaches the positioning part.

According to an embodiment of the present invention, the weight of the left guide half is equal to the weight of the right guide half, and the left and right guide halves are simultaneously molded using a single mold. Therefore, productivity is enhanced.

According to an embodiment of the present invention, the width of the recesses of the positioning parts in the front-rear direction is set to be greater than the width of the projections of the positioning parts in the front-rear direction, so that either the left guide half or the right guide half can be slid in the front-rear direction. Therefore, even when a tolerance is generated at the time of forming the left and right guide halves, one of the left and right guide halves can be slid. By this sliding operation, close contact between the flanges at the front edges of the guide halves and the front end of the chain guide bracket can be secured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A mode for carrying out the present invention will be described below, based on the accompanying drawings. The drawings are to be viewed according to the orientation of symbols. In addition, a chain drive type vehicle is described by application of a motorcycle. In the following description, the front, rear, left and right sides are defined with reference to a rider seated on an operator's seat.

A working example of the present invention will be described based on the drawings.

Figure 1:
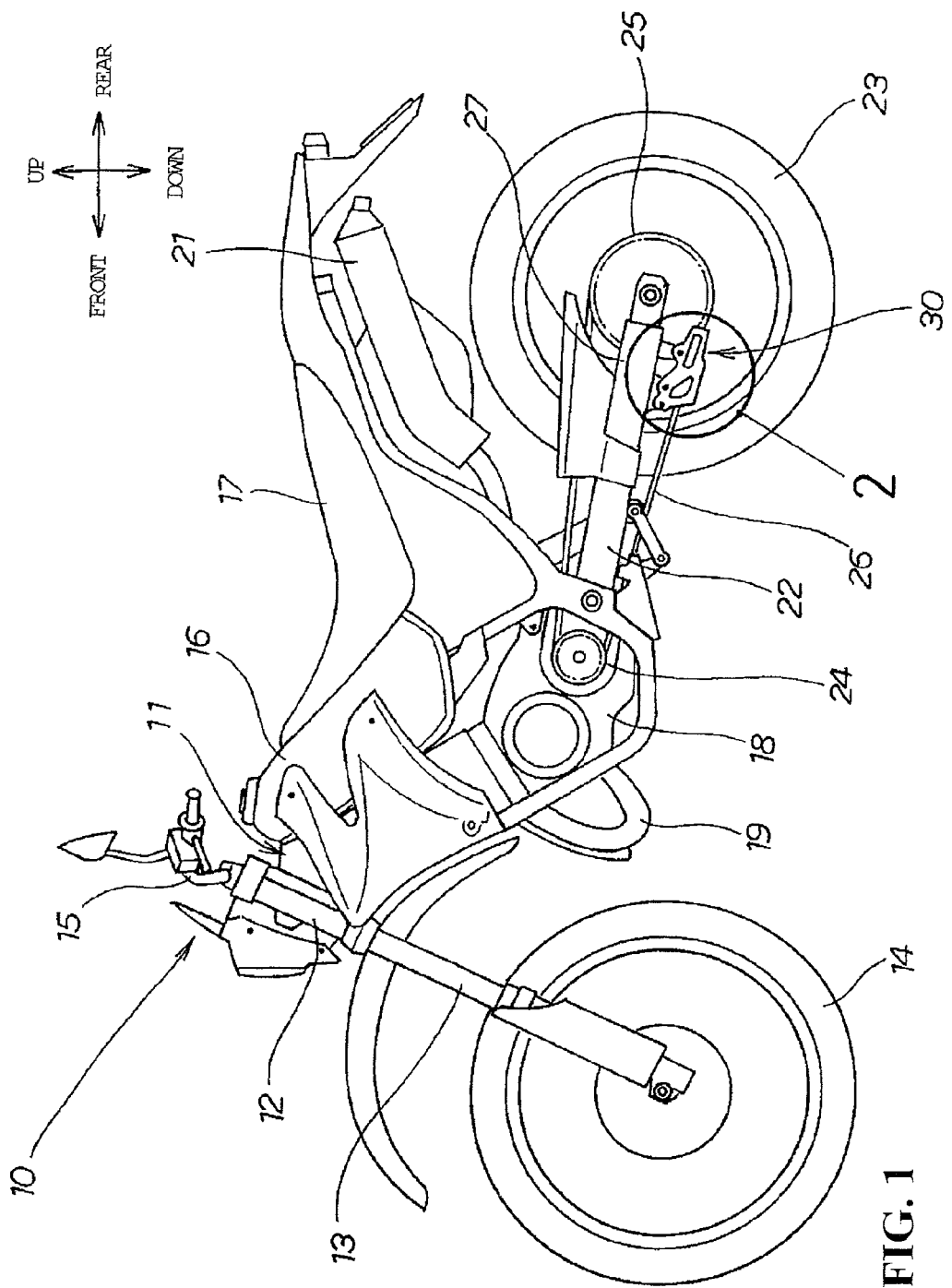
FIG. 1 is a left side view of a motorcycle pertaining to the present invention.

As shown in FIG. 1, a motorcycle 10 is a chain drive type vehicle in which a front fork 13 is steerably mounted to a head pipe 12 of a main frame 11, a front wheel 14 is rotatably mounted to lower ends of the front fork 13, a steering handle 15 is attached to the upper end of the front fork 13, a fuel tank 16 and a rider seat 17 are mounted to front and rear portions of the main frame 11, an engine 18 is provided at a lower portion of the main frame 11 with an exhaust pipe 19 and a muffler 21 are attached to the engine 18. A rear swing arm 22 is vertically swingably mounted to a lower portion of the main frame 11 with a rear wheel 23 rotatably provided at the rear end of the rear swing arm 22. An endless chain 26 is wrapped around a drive sprocket 24 provided at the engine 18 and a driven sprocket 25 provided on the rear wheel 23 with a chain guide device 30 (described in detail later) provided at a rear end portion 27 of the rear swing arm 22 for guiding the endless chain 26, with the rear end 23 being rotated through a driving force transmitting action of the endless chain 26. The configuration of the chain guide device 30 will be described referring to FIG. 2.

Figure 2:
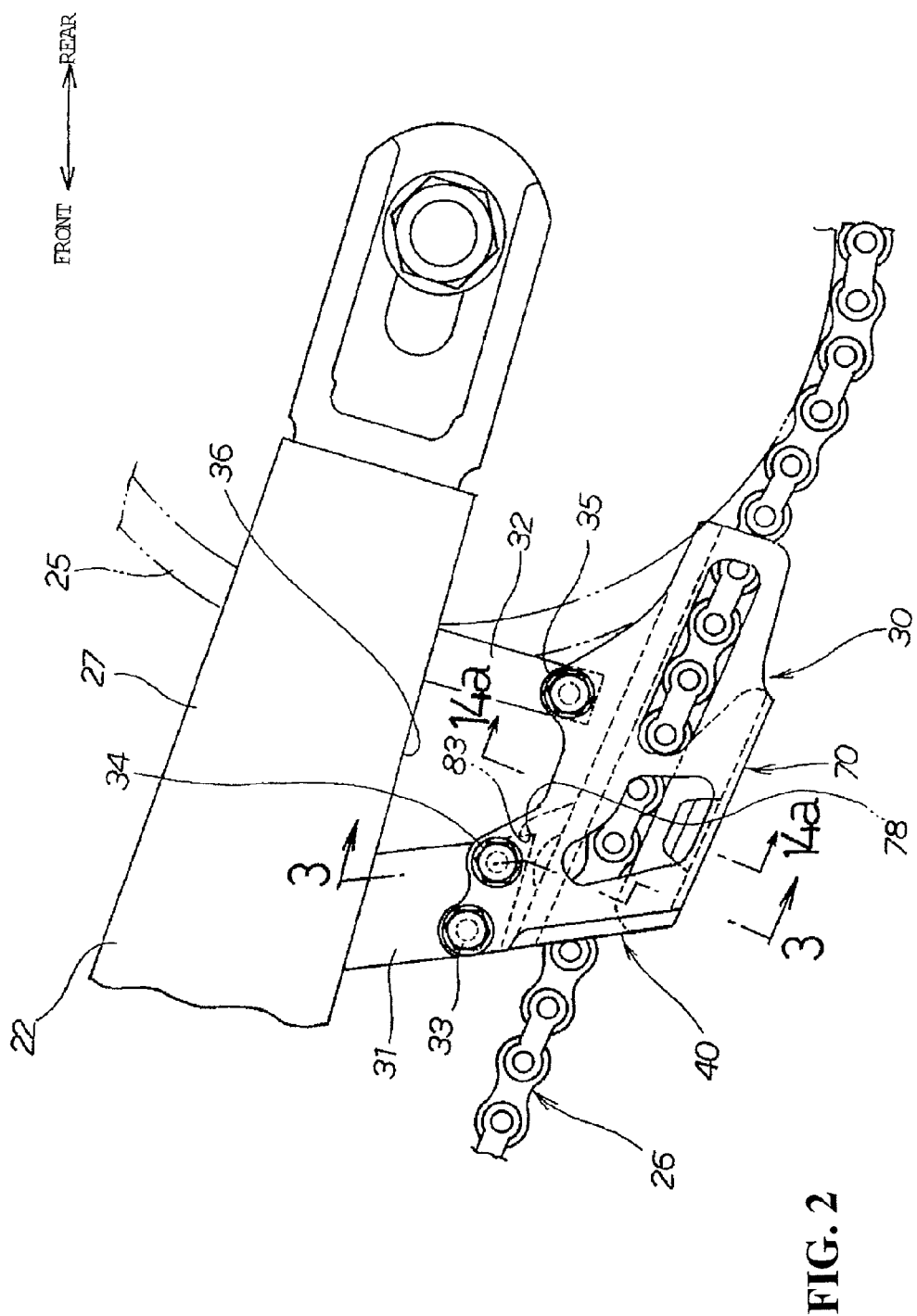
FIG. 2 is an enlarged view of part 2 of FIG. 1.

As shown in FIG. 2, the chain guide device 30 is mounted to a front-side support stay 31 provided at a front-side portion of a lower surface 36 of the rear end portion 27 of the rear swing arm 22, by bolts 33 and 34, and is mounted to a rear-side support stay 32 provided at a rear-side portion of the lower surface 36 of the rear end portion 27, by a bolt 35.

In addition, the chain guide device 30 includes an annular chain guide body 40 (described in detail later) for guiding the endless chain 26 while surrounding a portion in the longitudinal direction (front-rear direction) of the endless chain 26 and a chain guide bracket 70 (described in detail later) which is provided on the rear swing arm 22 through the front-side support stay 31 and the rear-side support stay 32 and which holds the chain guide body 40. A sectional shape of the chain guide body 40 will be described referring to FIG. 3.

Figure 3:
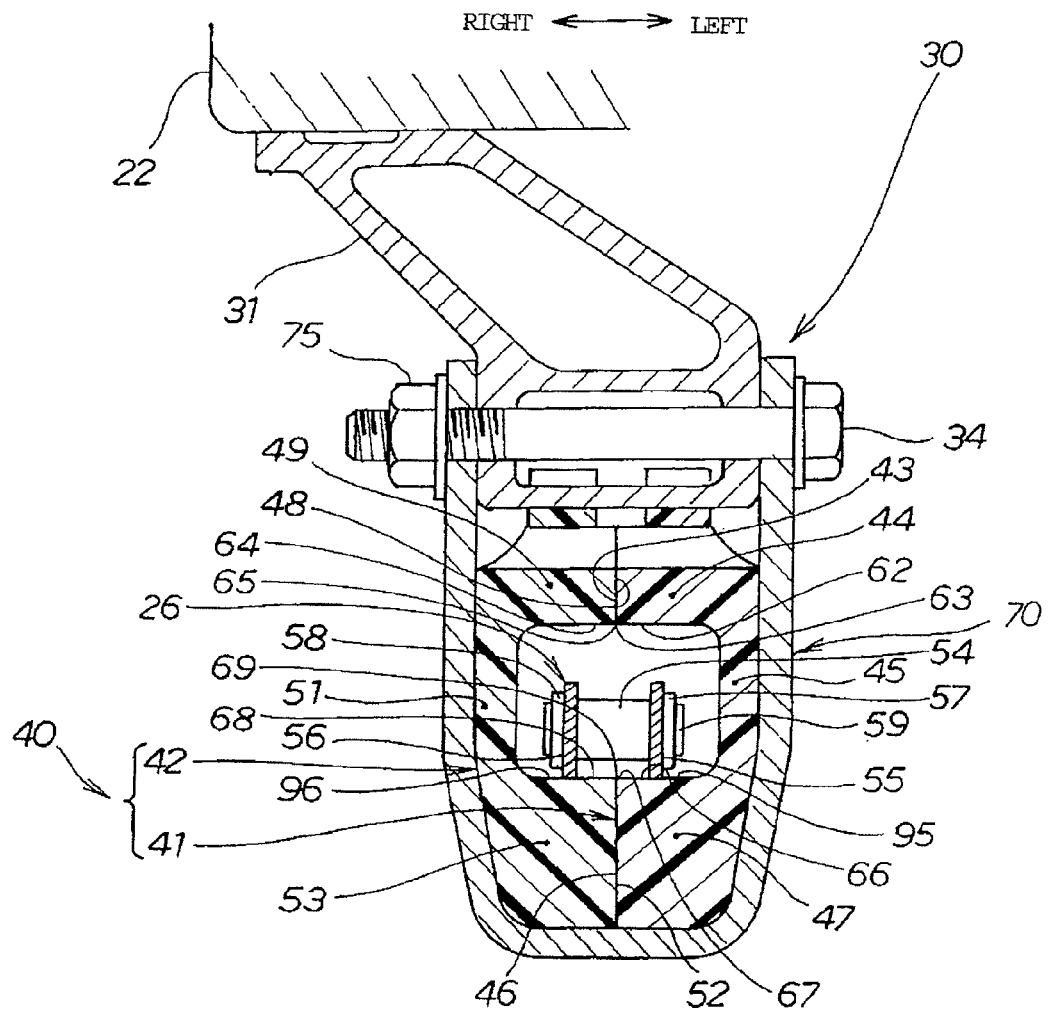
FIG. 3 is a sectional view taken along line 3-3 of FIG. 2.

As shown in FIG. 3, the chain guide body 40 is fitted inside the chain guide bracket 70 which is U-shaped in section. In addition, the chain guide body 40 is split along a vertical direction along the longitudinal direction of the endless chain 26 into a left guide half 41 and a right guide half 42.

The left guide body 41 includes a left-side upper wall 44 having a left-side upper split surface 43 formed along the longitudinal direction of the endless chain 26; a left side wall 45 extending downward from the left side of the left-side upper wall 44 and a left-side lower wall 47 extending to the right from the lower side of the left side wall 45 and having a left-side lower split surface 46 along the longitudinal direction of the endless chain 26. In addition, the right guide half 42 includes a right-side upper wall 49 having a right-side upper split surface 48 formed along the longitudinal direction of the endless chain 26, a right side wall 51 extending downward from the right side of the right-side upper surface 49 and a right-side lower wall 53 extending to the left from the lower side of the right side wall 51 and having a right-side lower split surface 52 along the longitudinal direction of the endless chain 26.

Further, the chain guide body 40 is configured so as to surround a portion in the longitudinal direction of the endless chain 26 by coupling the left guide half 41 and the right guide half 42, which are roughly U-shaped in cross section. The roughly U-shaped guide halves 41 and 42 can be easily demolded after injection molding, so that productivity can be enhanced.

In addition, since the left-side upper split surface 43 and the left-side lower split surface 46 of the left guide half 41 as well as the right-side upper split surface 48 and the right-side lower split surface 52 of the right guide half 42 are formed along the longitudinal direction of the endless chain 26, it is ensured that the left-side upper split surface 43, the left-side lower split surface 46, the right-side upper split surface 48 and the right-side lower split surface 52 are parallel to the longitudinal direction of the endless chain 26.

Let a longitudinal edge of a left-side upper split part 62 of the upper wall 44 be a left-side upper edge 63, let a longitudinal edge of a right-side upper split part 64 of the upper wall 49 be a right-side upper edge 65, let a longitudinal edge of a left-side lower split part 66 of the lower wall 47 be a left-side lower edge 67, and let a longitudinal edge of a right-side lower split part 68 of the lower wall 53 be a right-side lower edge 69, then the left-side upper edge 63, the right-side upper edge 65, the left-side lower edge 67 and the right-side lower edge 69 are parallel to the traveling direction of the endless chain 26.

Therefore, the endless chain 26 is less liable to make contact with the longitudinal edges of the split parts of the upper and lower walls, as compared with the case where the longitudinal edges of the split parts of the upper and lower walls are disposed at an angle relative to the longitudinal direction of the endless chain. Accordingly, the possibility of contact of the endless chain 26 with the left-side upper split surface 43, the left-side lower split surface 46, the right-side upper split surface 48 and the right-side lower split surface 52 is also lessened. In other words, wearing of the left-side upper split surface 43, the left-side lower split surface 46, the right-side upper split surface 48 and the right-side lower split surface 52 is suppressed. Consequently, it is unnecessary to make the chain guide body 40 greater in thickness and weight.

In addition, it is unnecessary to elastically deform the chain guide body 40 at the time of mounting the chain guide body 40 to the chain guide bracket 70, so that an elastic material which is high in durability and hard can be used. Therefore, it is possible to provide a chain guide device 30 such that it is unnecessary to make the chain guide body 40 a thick and heavy member and productivity of the chain guide body 40 can be enhanced. In addition, since the left guide half 41 and the right guide body 42 which are roughly U-shaped are simple in structure, a high-strength resin material generally poor in fluidity when melted can be easily shaped (molded).

The endless chain 26 includes left roller link plates 55 and right roller link plates 56 provided on the left and right sides of rollers 54 so as to interlink the rollers 54 and to rotatably support the rollers 54. The left-side lower split surface 46 of the left guide half 41 and the right-side lower split surface 52 of the right guide half 42 are disposed between the left roller link plates 55 and the right roller link plates 56 when the endless chain 26 is passed through the chain guide body 40.

A left pin link plate 57 is provided on the left side of the left roller link plate 55, while a right pin link plate 58 is provided on the right side of the right roller link plate 56. The four link plates 55, 56, 57 and 58 are held together with the roller 54 by a pin 59. The condition in which the endless chain 26 is put in contact with a right inner wall surface of the right side wall 51 will be described referring to FIG. 4.

Figure 4:
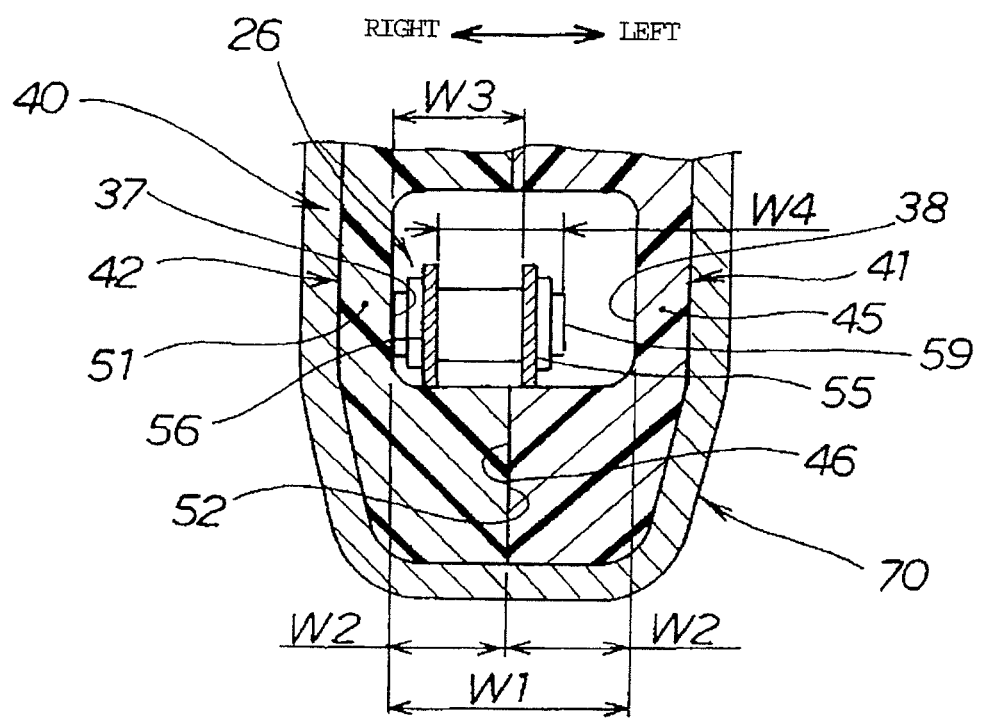
FIG. 4 illustrates the condition where an endless chain makes contact with a right inner wall surface of a right side wall of a chain guide body.

As shown in FIG. 4, the width W1 between a left inner wall surface 38 of the left side wall 45 and the right inner wall surface 37 of the right side wall 51 is set so that the left roller link plate 55 is located astride the left-side lower split surface 46 and the right-side lower split surface 52 when the endless chain 26 is put in contact with the right inner wall surface 37 of the right side wall 51.

The length from the left inner wall surface 38 of the left side wall 45 to the left-side lower split surface 46 and the length from the right inner wall surface 37 of the right side wall 51 to the right-side lower split surface 52 are equal and represented by W2, while the length from the right end of the pin 59 of the endless chain 26 to the inner surface of the left roller link plate 55 is represented by W3, and the length W2 and the length W3 are in a magnitude relation of W3>W2. This ensures a structure wherein when the endless chain 26 is put in contact with the right inner wall surface 37 of the right side wall 51, the left roller link plate 55 does not make contact with either the left-side lower split surface 46 or the right-side lower split surface 52.

In addition, when the length from the left end of the pin 59 of the endless chain 26 to the inner surface of the right roller link plate 56 is represented by W4 and the magnitude relation between the length W2 and the length W4 is W4>W2, the right roller link plate 56 does not make contact with either the left-side lower split surface 46 or the right-side lower split surface 52 even when the endless chain 26 makes contact with the left inner wall surface 38 of the left side wall 45. The procedure of disassembling the support stays and the chain guide device will be described referring to FIG. 5.

Figure 5:
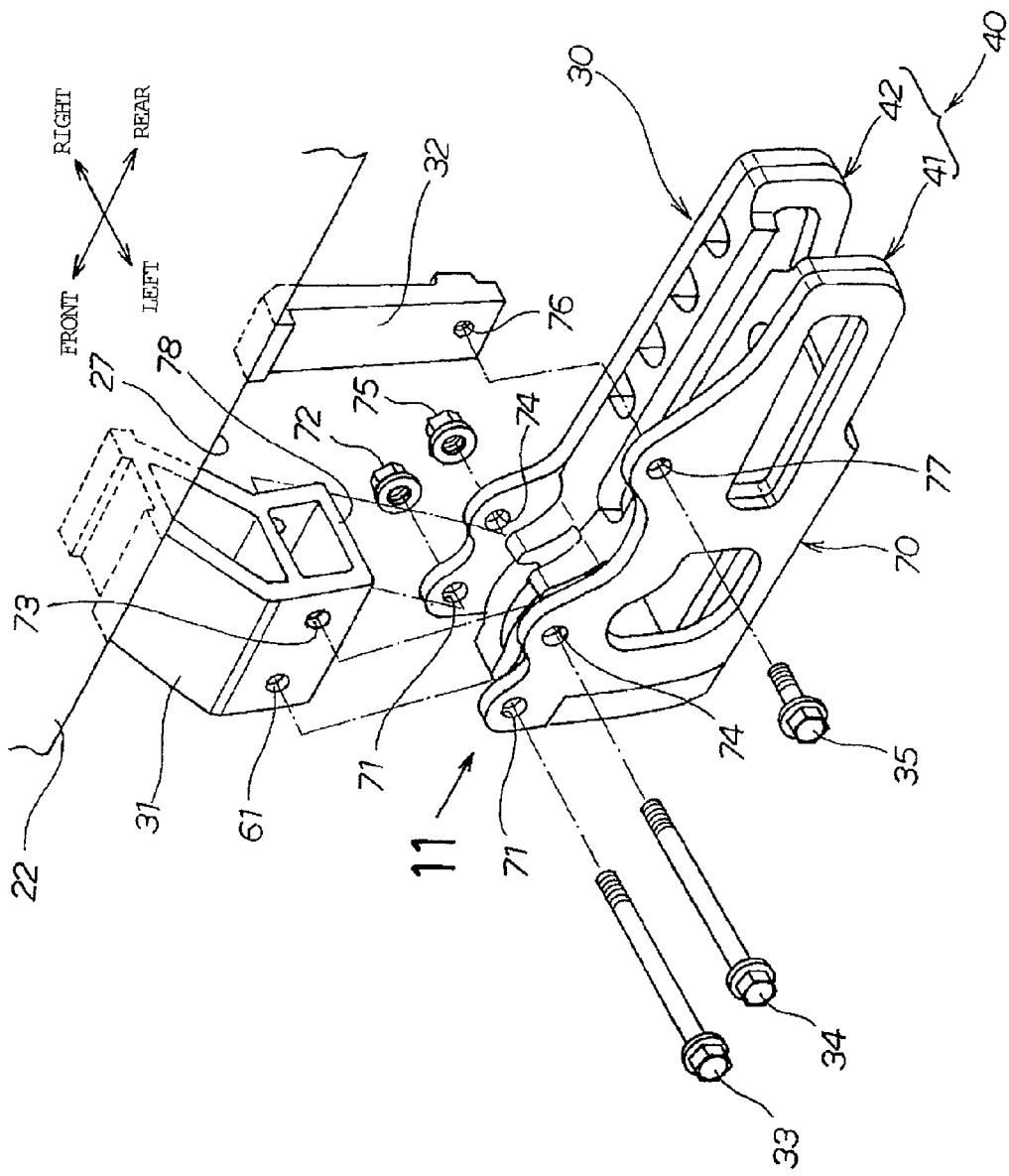
FIG. 5 is an exploded perspective view of a support stay and a chain guide device.

As shown in FIG. 5, a bolt 33 and a nut 72 are detached from a hole 61 in the front-side support stay 31 and a hole 71 in the chain guide bracket 70, whereas a bolt 34 and a nut 75 are detached from a hole 73 in the front-side support stay 31 and a hole 74 in the chain guide bracket 70, and a bolt 35 is detached from a screw hole 76 in the rear-side support stay 32 and a hole 77 in the chain guide bracket 70, whereby the front-side support stay 31 as well as the rear-side support stay 32 and the chain guide device 30 are separated from each other.

The front-side support stay 31 is provided at its rear end with a pressing part 78 for pressing lock pieces (described later) provided respectively in the left guide half 41 and the right guide half 42. The procedure of disassembling the chain guide body 40 and the chain guide bracket 70 will be described referring to FIG. 6.

Figure 6:
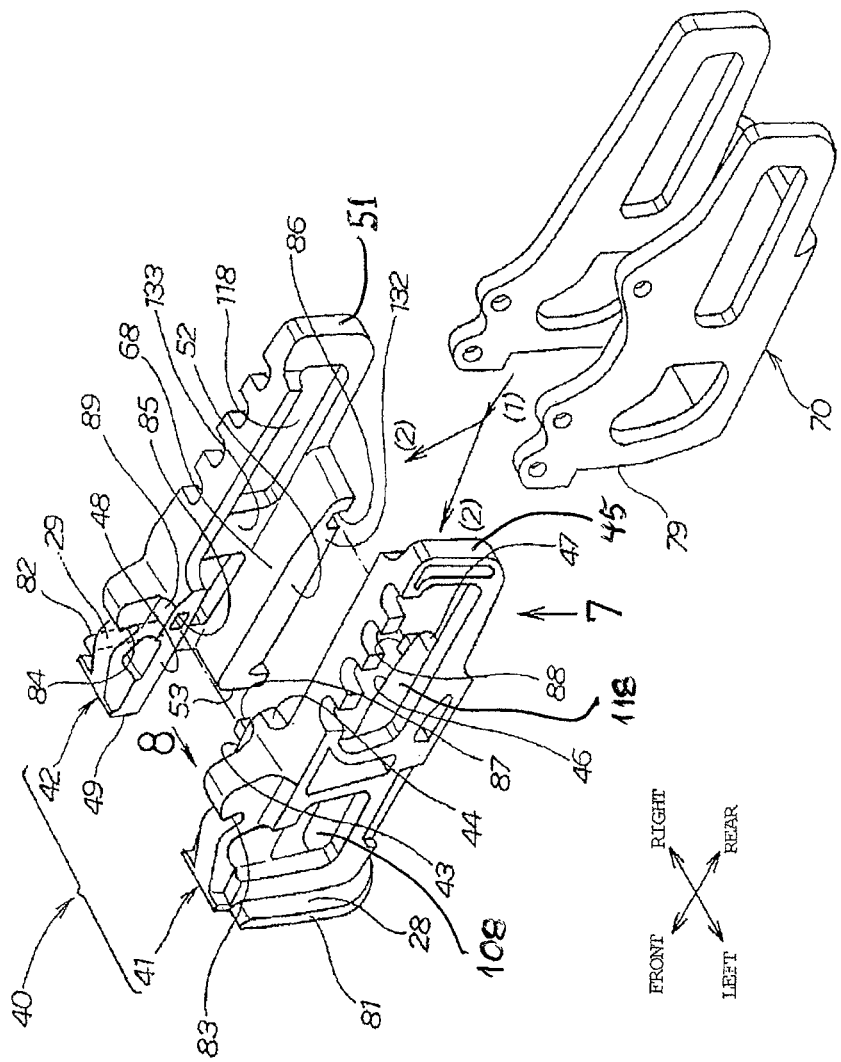
FIG. 6 is an exploded perspective view of a chain guide bracket and the chain guide body.

As shown in FIG. 6, the chain guide body 40 is detached from the chain guide bracket 70 as indicated by arrow (1), and the chain guide body 40 is separated into the left guide half 41 and the right guide half 42 as indicated by arrow (2). Further, the right side wall 51 of the right guide half 42 is provided with right-side lightening windows 108, 118, each composed of a slot elongated in the longitudinal direction of the endless chain, and a right-side reinforcing beam 133 is provided so as to bridgingly interconnect an upper edge and a lower edge of each of the right-side lightening windows 108, 118.

The chain guide bracket 70 is formed to be U-shaped in section so as to cover the outside surface of the chain guide body 40 while being mounted to the rear swing arm (symbol 22 in FIG. 2) through the front-side support stay (symbol 31 in FIG. 2) and the rear-side support stay (symbol 32 in FIG. 2). A left-side flange 81 and a right-side flange 82 to be abutted on front ends 79 of the chain guide bracket 70 from the front side are provided respectively at the front edge of the left guide half 41 and at the front edge of the right guide half 42. A left-side lock piece 83 and a right-side lock piece 84 to be locked by the pressing part (symbol 78 in FIG. 2) constituting a part of the front-side support stay are provided respectively at an upper portion of the left guide half 41 and at an upper portion of the right guide half 42. The chain guide body 40 is held by fixing the chain guide bracket 70 to the support stays in the condition where a rear surface 28 of the left-side flange 81 and a rear surface 29 of the right-side flange 82 are in contact with the chain guide bracket 70 and where the left-side lock piece 83 and the right-side lock piece 84 are pressed rearward by the pressing part of the front-side support stay.

Therefore, the chain guide body 40 can be prevented from being disengaged from the chain guide bracket 70 in the vehicle front-rear direction parallel to the longitudinal direction of the endless chain (symbol 26 in FIG. 2).

In addition, the right-side upper split surface 48 of the right-side upper wall 49 is provided with an upper-side recess 85 recessed to the right side, and the right-side lower split surface 52 of the right-side lower wall 53 is provided with a lower-side recess 86 recessed to the right side. The left-side upper split surface 43 of the left-side upper wall 44 is provided with an upper-side projection 87 projecting toward the upper-side recess 85 in the right-side upper split surface 48, and the left-side lower split surface 46 of the left-side lower wall 47 is provided with a lower-side projection 88 projecting toward the lower-side recess 86 in the right-side lower split surface 52. In addition, the lower-side recess 86 is formed in a rear portion 132 of the right-side lower split part 68, which is on the outlet side (rear side) of the endless chain.

Further, the right-side upper wall 49 is provided with a right-side lock piece base part 89 formed to be thick and heavy, and a right-side lock piece 84 is provided at an upper portion of the right-side lock piece base part 89. In addition, the upper-side recess 85 is provided in the right-side lock piece base part 89 and in the right-side upper split surface 48. The size relation between the upper-side recess 85 and the upper-side projection 87 and the size relation between the lower-side recess 86 and the lower-side projection 88 will be described referring to FIG. 7.

Figure 7:
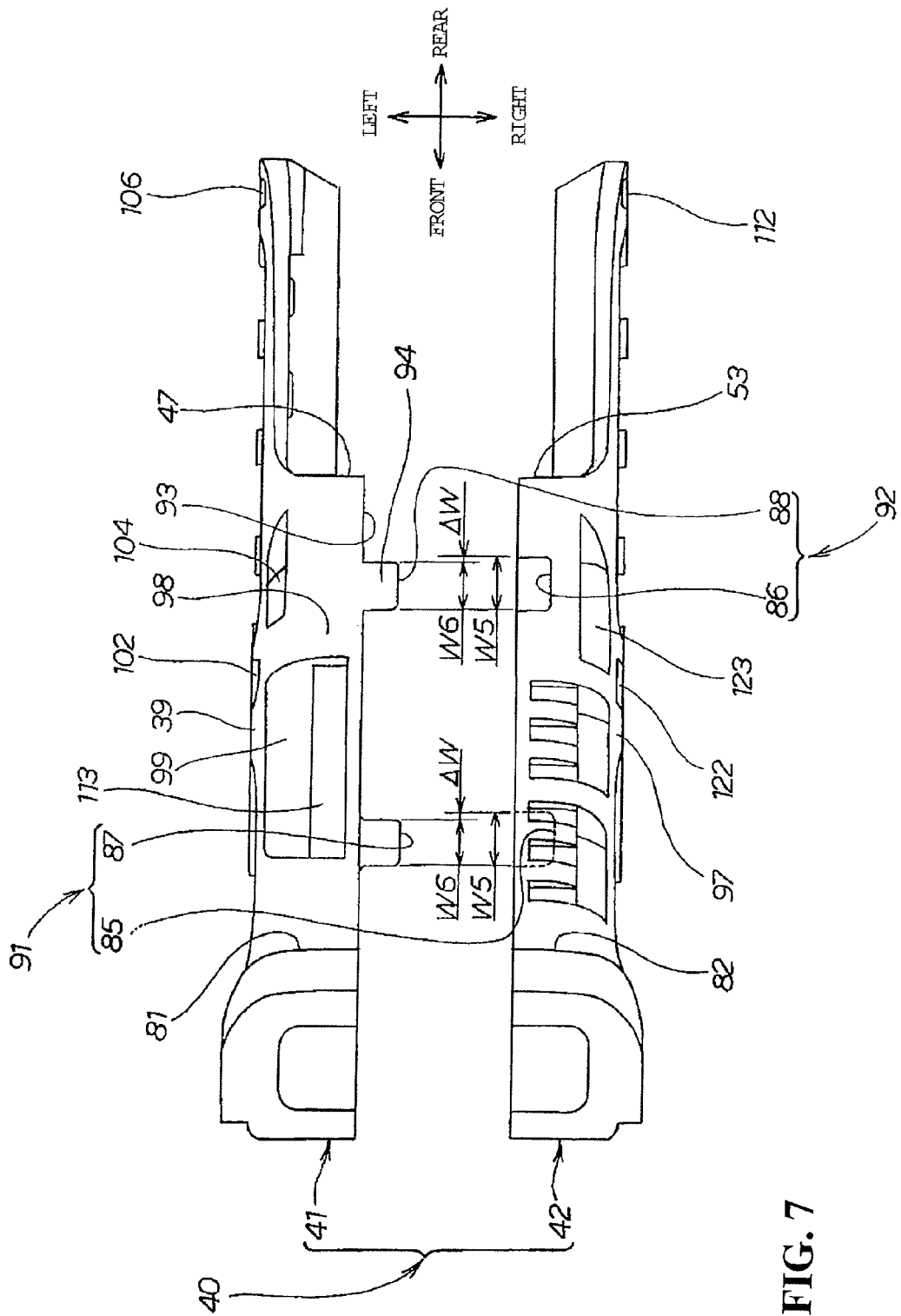
FIG. 7 is a view along arrow 7 of FIG. 6.

As shown in FIG. 7, the width W5 of the upper-side recess 85 in the front-rear direction is set to be greater than the width W6 of the upper-side projection 87 by ΔW, and the width W5 of the lower-side recess 86 in the front-rear direction is set to be greater than the width W6 of the lower-side projection 88 by ΔW, whereby either one of the left guide half 41 and the right guide half 42 can be slid in the front-rear direction.

In addition, an upper-side positioning part 91 for the left-side upper wall (symbol 44 in FIG. 6) and the right-side upper wall (symbol 49 in FIG. 6) includes the upper-side recess 85 and the upper-side projection 87, whereas a lower-side positioning part 92 for the left-side lower wall 47 and the right-side lower wall 53 includes the lower-side recess 86 and the lower-side projection 88.

The lower-side positioning part 92 is formed so that the lower end of the lower-side recess 86 is opened to the lower side of the right-side lower wall 53, and the lower-side projection 88 is formed at the position of a bottom wall surface 93 of the left-side lower wall 47, in such a manner that a lower surface 94 of the lower-side projection 88 is exposed from the lower-side recess 86 when the left guide half 41 and the right guide half 42 are put in contact with each other. At the time of assembling the left guide half 41 and the right guide half 42, first, the upper-side recess 85 and the upper-side projection 87 of the lower-side positioning part 92 are fitted to each other, and then the lower-side recess 86 and the lower-side projection 88 of the upper-side positioning part 91 are fitted to each other, whereby assembling of the guide halves onto each other is facilitated.

In addition, the lower-side positioning part 92 has a configuration in which the lower-side projection 88 is formed at the position of the bottom wall surface 93 of the left-side lower wall 47, and the lower-side recess 86 is formed in the right-side lower wall 53 coinciding with the position of the lower-side projection 88. Therefore, the lower-side positioning part 92 is structured so as to be spaced the most apart from a left-side upper surface (symbol 95 in FIG. 3) of the left-side lower wall 47 and a right-side upper surface (symbol 96 in FIG. 3) of the right-side lower wall 53, which are worn due to the passage thereon of the endless chain (symbol 26 in FIG. 3).

Further, a right-side intermediate upper lightening hole part 122 recessed in the direction opposite to the recessing direction of the upper-side recess 85 and the lower-side recess 86 is provided on the upper side of an intermediate portion of a right-side outer side surface 97 of the right guide half 42.

Besides, a right-side intermediate lower lightening hole part 123 recessed in the direction opposite to the recessing direction of the upper-side recess 85 and the lower-side recess 86 is provided on the lower side of an intermediate portion of the right-side outer side surface 97. Further, a right-side rear lightening hole part 112 recessed in the direction opposite to the recessing direction of the upper-side recess 85 and the lower-side recess 86 is provided at a rear portion of the right-side outer side surface 97. A detailed structure of the upper-side positioning part 91 will be described referring to FIG. 8.

Figure 8:
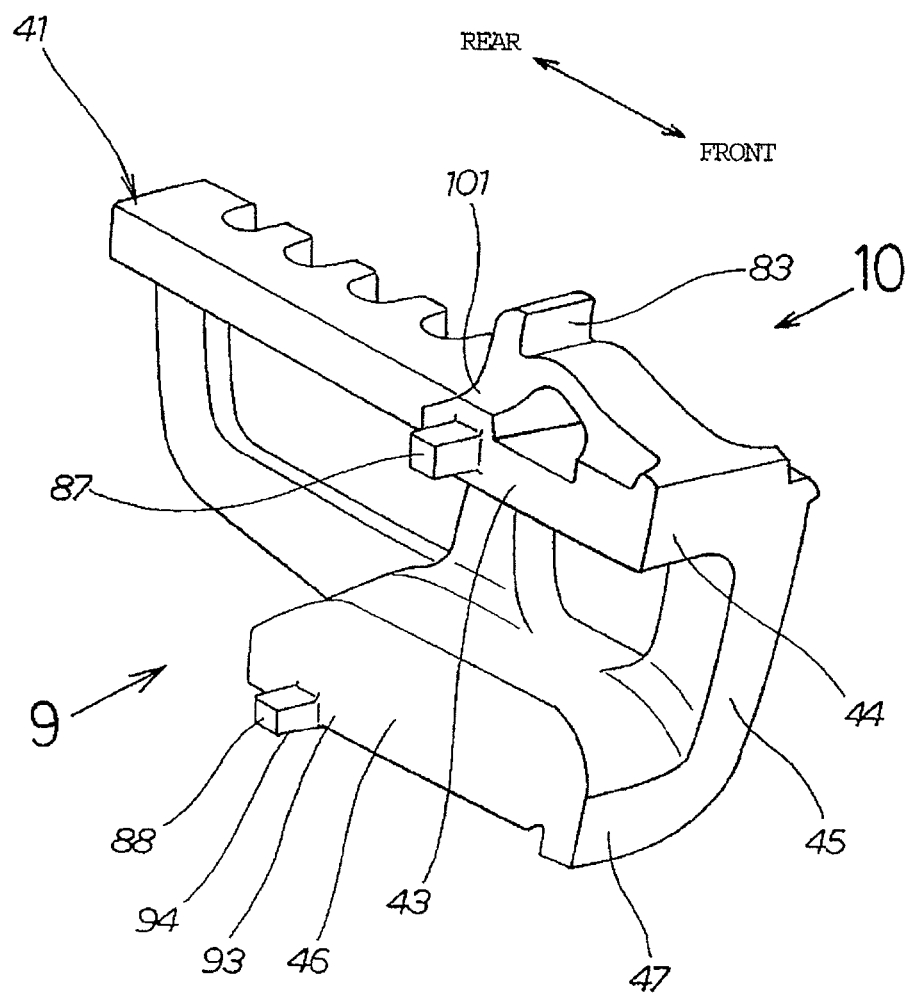
FIG. 8 is a view along arrow 8 of FIG. 6.

As shown in FIG. 8, the left-side upper wall 44 of the left guide half 41 is provided with a left-side lock piece base part 101, which is formed to be thick and heavy, and the left-side lock piece 83 is provided at an upper portion of the left-side lock piece base part 101. In addition, the upper-side projection 87 is provided at the left-side lock piece base part 101 and on the left-side upper split surface 43 of the left-side upper wall 44.

In other words, the upper-side positioning part (symbol 91 in FIG. 7) for the left-side upper wall 44 and the right-side upper wall (symbol 49 in FIG. 6) is provided so as to face the left-side upper split surface 43 and the right-side upper split surface (symbol 48 in FIG. 6) at positions corresponding to the left-side lock piece base part 101 and the right-side lock piece base part (symbol 89 in FIG. 6). Therefore, the rigidity of the upper-side positioning part is enhanced, and the rigidity of the chain guide body (symbol 40 in FIG. 3) can be secured. The position of the lower-side positioning part in the front-rear direction will be described referring to FIG. 9.

Figure 9:
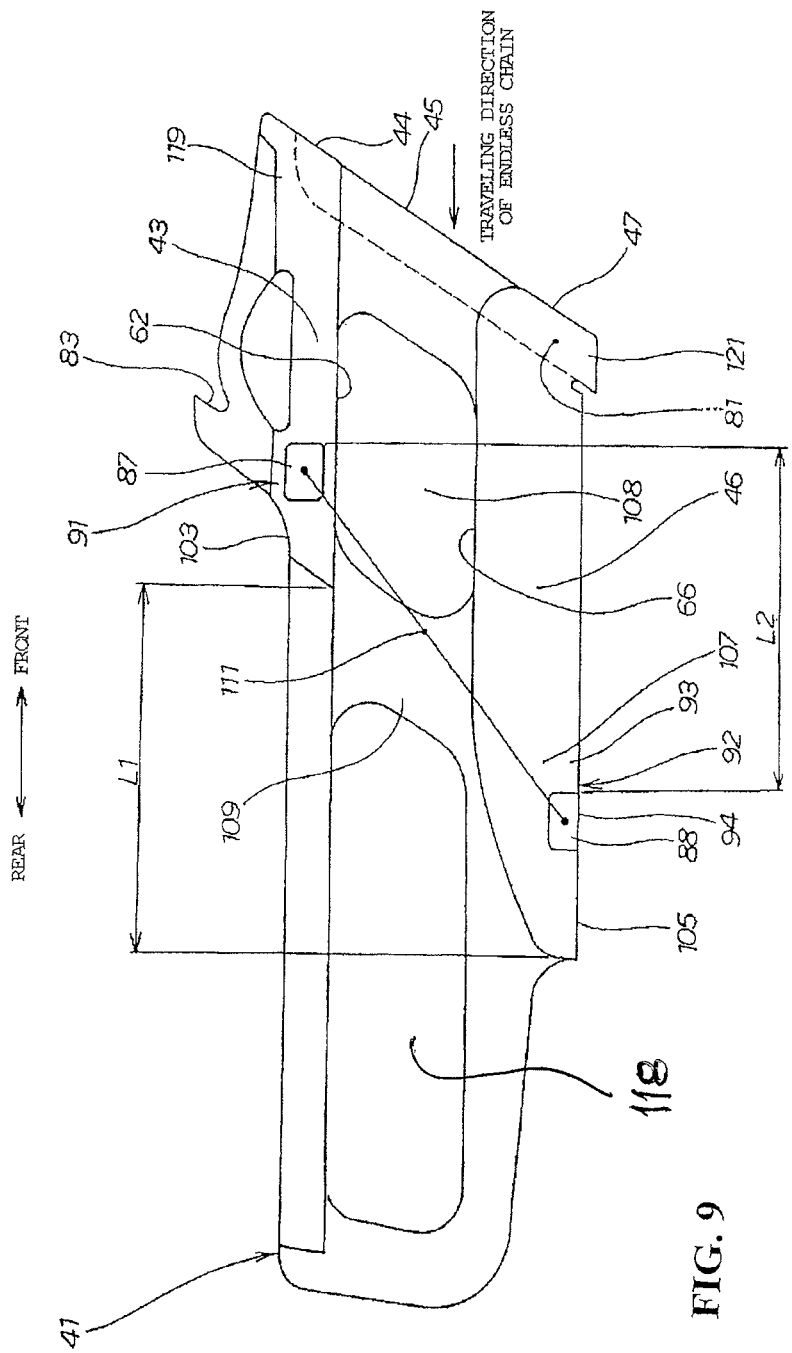
FIG. 9 is a view along arrow 9 of FIG. 8.

As shown in FIG. 9, the left-side upper wall 44 and the left-side lower wall 47 of the left guide half 41 respectively have the left-side upper split part 62 and the left-side lower split part 66 formed along the traveling direction (from the front side toward the rear side) of the endless chain (symbol 26 in FIG. 2), and the lower-side projection 88 in the lower-side positioning part 92 is provided at a left-side lower split rear portion 107 of the left-side lower split part 66, which is on the outlet side of the endless chain. Since the position of the lower-side positioning part 92 is on the outlet side opposite to the inlet side of the endless chain on which wearing is more liable to occur, the lower-side positioning part 92 can be protected.

In addition, since the length of the left-side lower split part 66 in the longitudinal direction is set to be greater than the length of the left-side upper split part 62 in the longitudinal direction, the endless chain can be effectively guided by the left-side lower wall 47.

Further, an inlet upper-side end portion 119 and an outlet upper-side end portion 103 are provided on the endless chain inlet side and outlet side of the left-side, whereas an inlet lower-side end portion 121 and an outlet lower-side end portion 105 are provided on the endless chain inlet side and outlet side of the left-side lower split part 66, and the outlet upper-side end portion 103 is provided with a forward offset from the outlet lower-side end portion 105 by a length L1. The outlet lower-side end portion 105 can be disposed at a rearwardly deviated position according to the attachment angle of the left-side flange 81 at the front edge of the left guide half 41, which ensures that the endless chain can be effectively guided by the left-side lower wall 47 even when the attachment angle of the left-side flange 81 is changed.

In addition, while the outlet upper-side end portion 103 has been provided with a forward offset relative to the outlet lower-side end portion 105 in the present example, the outlet upper-side end portion 103 may be provided with a rearward offset relative to the outlet lower-side end portion 105.

In addition, the lower-side positioning part 92 for the left-side lower wall 47 is provided with a rearward offset by a length L2 relative to the upper-side positioning part 91 for the left-side upper wall 44. Consequently, the spacing between the upper-side positioning part 91 and the lower-side positioning part 92 in the vertical direction can be made large, so that relative rotational deviation between the left and right guide halves after assembly can be reduced.

Figure 10:
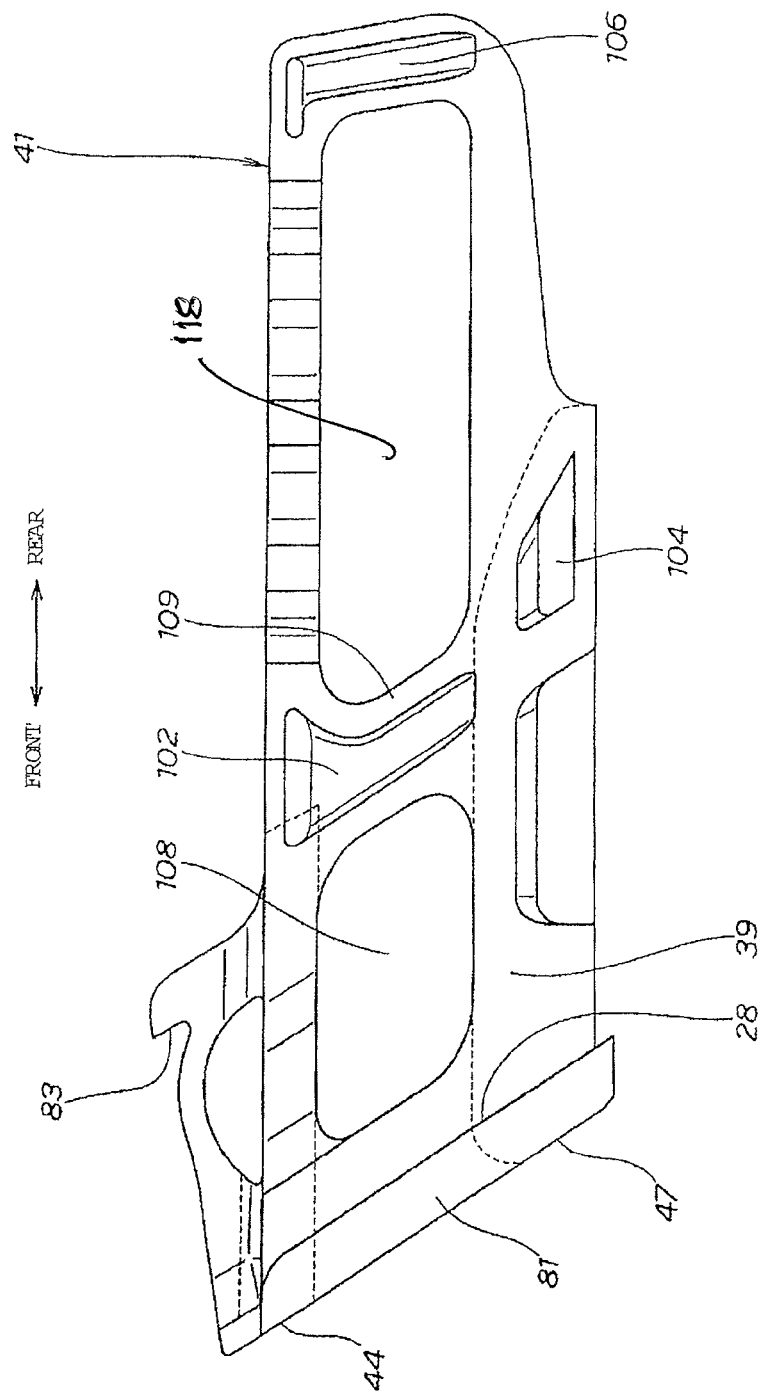
FIG. 10 is a view along arrow 10 of FIG. 8.

Further, as can be seen in FIGS. 6, 9, and 10, the left side wall 45 of the left guide half 41 is provided with left-side lightening windows 108, 118 each composed of a slot elongated in the longitudinal direction of the endless chain. A left-side reinforcing beam 109 is provided so as to bridgingly interconnect an upper edge and a lower edge of each of the left-side lightening windows 108, 118. The left-side reinforcing beam 109 is provided between the upper-side positioning part 91 and the lower-side positioning part 92, is inclined to the same side as the inclination of a line 111 interconnecting the upper-side positioning part 91 and the lower-side positioning part 92, and is formed so as to roughly overlap with the line 111 in side view.

The left-side reinforcing beam 109 enhances the rigidity of the left guide half 41. Therefore, even in the case where a holding force of the left-side lock piece 83 is lowered due to movement of the left-side lock piece 83 according to tolerances generated at the time of forming the left and right guide halves, after assembly of the chain guide device (symbol 30 in FIG. 2) onto the front-side support stay (symbol 31 in FIG. 2) and the rear-side support stay (symbol 32 in FIG. 2), the assembled state of the chain guide body can be maintained while securing the rigidity between the left and right guide halves by the upper-side positioning part 91 and the lower-side positioning part 92 reinforced by the left-side reinforcing beam 109.

In addition, while the structures relating to the offset between the outlet upper-side end portion and the outlet lower-side end portion, the lightening window, and the reinforcing beam have been described referring to the left guide half 41 in the present example, the right guide half (symbol 42 in FIG. 6) is the same as the left guide half 41 in structure. The structure of an outside surface of the guide half will be described referring to FIG. 10.

As shown in FIG. 10, a left-side intermediate upper lightening hole part 102 recessed along the projecting direction of the upper-side projection (symbol 87 in FIG. 7) and the lower-side projection (symbol 88 in FIG. 7) is provided on the upper side of an intermediate portion of a left-side outer side surface 39 of the left guide half 41. In addition, a left-side intermediate lower lightening hole part 104 recessed along the projecting direction of the upper-side projection and the lower-side projection is provided on the lower side of an intermediate portion of the left-side outer side surface 39. Further, a left-side rear lightening hole part 106 recessed along the projecting direction of the upper-side projection and the lower-side projection is provided in a rear portion of the left-side outer side surface 39.

In the left guide half 41, the recessing direction of the left-side intermediate upper lightening hole part 102, the left-side intermediate lower lightening hole part 104 and the left-side rear lightening hole part 106 coincides with the projecting direction of the upper-side projection and the lower-side projection. In the right guide half (symbol 42 in FIG. 7), the recessing direction of the right-side intermediate upper lightening hole part (symbol 122 in FIG. 7), the right-side intermediate lower lightening hole part (symbol 123 in FIG. 7) and the right-side rear lightening hole part (symbol 112 in FIG. 7) coincides with the direction opposite to the recessing direction of the upper-side recess (symbol 85 in FIG. 7) and the lower-side recess (symbol 86 in FIG. 7). The left guide half and the right guide half can be simultaneously injection molded by arranging the guide halves in the same orientation, so that the guide halves can be demolded in the same direction after injection molding, and the molding of the guide halves is facilitated.

In addition, the weight of the left guide half 41 can be reduced by the presence of the left-side intermediate upper lightening hole part 102, the left-side intermediate lower lightening hole part 104 and the left-side rear lightening hole part 106. Similarly, the weight of the right guide half can be reduced by the presence of the right-side intermediate upper lightening hole part, the right-side intermediate lower lightening hole part and the right-side rear lightening hole part.

Further, the left-side intermediate lower lightening hole part 104 is provided at a position overlapping with the left-side lower wall 47 in the side view, whereby the depth of the left-side intermediate lower lightening hole part 104 can be enlarged. Similarly, the right-side intermediate lower lightening hole part (symbol 123 in FIG. 7) is provided at a position overlapping with the right-side lower wall (symbol 53 in FIG. 7) in the side view, whereby the depth of the right-side intermediate lower lightening hole part can be enlarged. Accordingly, the chain guide body can be further reduced in weight. The assembled structure of the left guide half and the right guide half will be described referring to FIG. 11.

Figure 11:
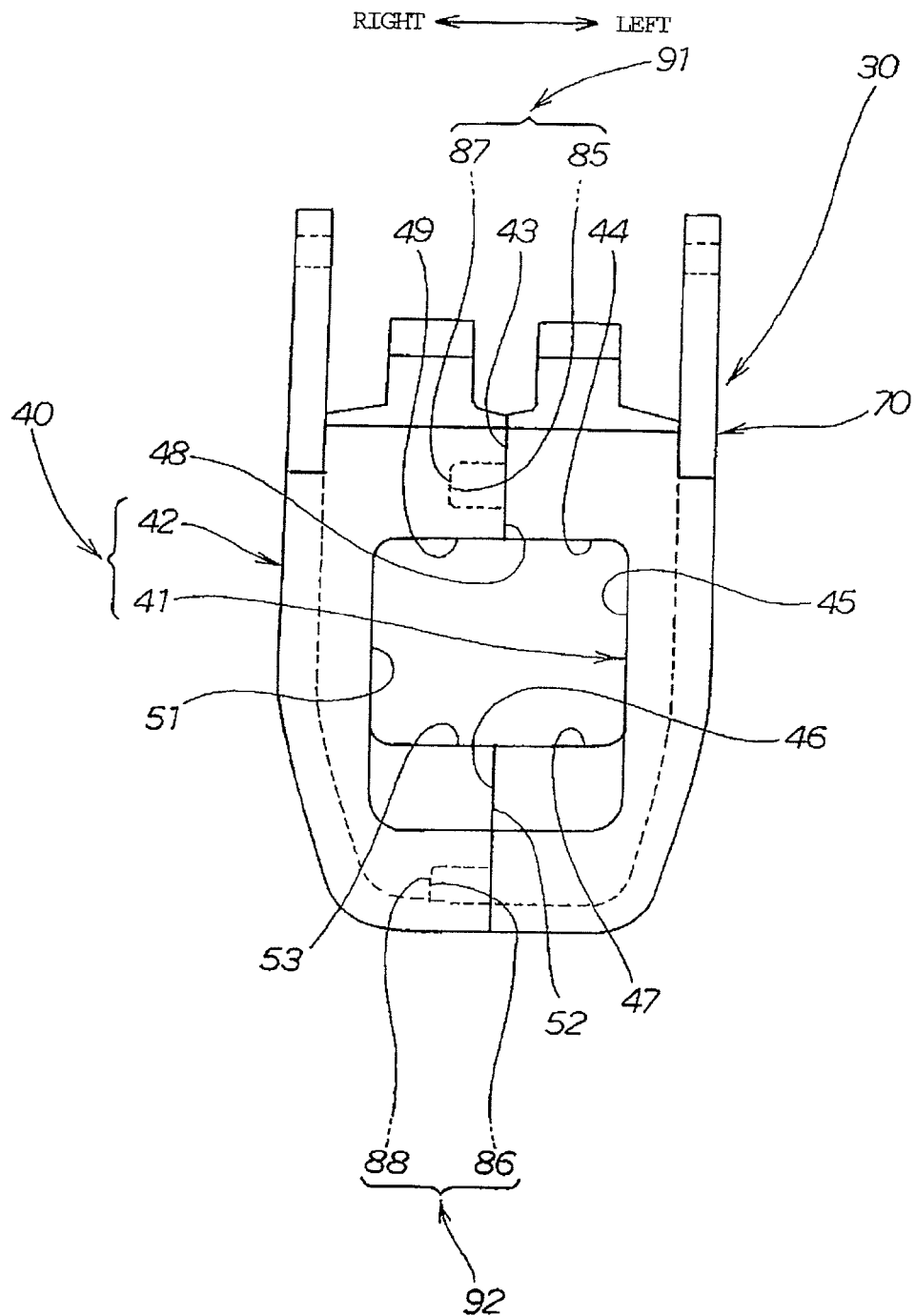
FIG. 11 is a view along arrow 11 of FIG. 5.

As shown in FIG. 11, the left guide half 41 and the right guide half 42 are united together by fitting the upper-side recess 85 and the upper-side projection 87 of the upper-side positioning part 91 to each other and fitting the lower-side recess 86 and the lower-side projection 88 of the lower-side positioning part 92 to each other. The upper-side positioning part 91 and the lower-side positioning part 92 facilitate the operation of assembling the left guide half 41 and the right guide half 42.

In addition, the weight of the left guide half 41 is equal to the weight of the right guide half 42, and the left and right guide halves are molded using a single mold, so that productivity is enhanced.

The operation of the chain guide device 30 as above-described will be described below.

Figures 12A, 12B:
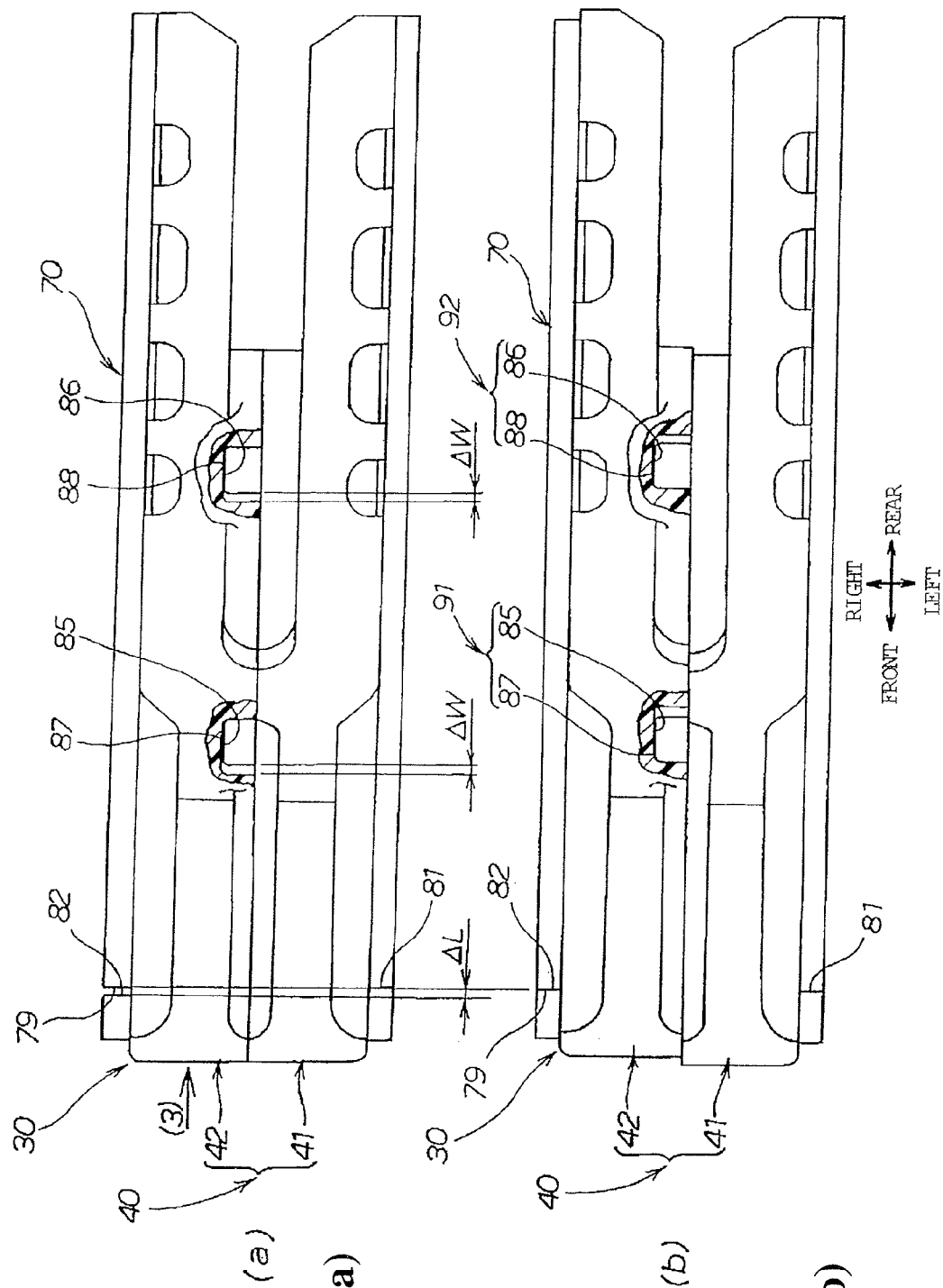
FIGS. 12(a) and 12(b) illustrate a sliding operation of a left guide half and a right guide half.

As shown in FIG. 12(*a*), in the chain guide device 30 in an assembled state, a tolerance is generated as to the right-side flange 82 provided at the front edge of the right guide half 42, and a gap ΔL in the front-rear direction is generated between the right-side flange 82 and the front end 79 of the chain guide bracket 70. In this instance, a gap ΔW in the front-rear direction is generated between the upper-side recess 85 and the upper-side projection 87, and a gap ΔW in the front-rear direction is generated between the lower-side recess 86 and the lower-side projection 88.

When the right guide half 42 is pushed as indicated by arrow (3), the right guide half 42 is slid rearward relative to the left guide half 41 and the chain guide bracket 70, which are stationary. Consequently, as shown in FIG. 12(*b*), the right-side flange 82 of the right guide half 42 and the front edge 79 of the chain guide bracket 70 make contact with each other.

Even if a tolerance is generated at the time of forming the left guide half 41 and the right guide half 42, either the left guide half 41 or the right guide half 42 can be slid. Therefore, close contact between the left-side flange 81 at the front edge of the left guide half 41 and the front end 79 of the chain guide bracket 70, or close contact between the right-side flange 82 at the front edge of the right guide half 42 and the front end 79 of the chain guide bracket 70, can be secured. Now, a worn state of the chain guide body 40 after the laps of operation time of the motorcycle will be described below.

Figure 13:
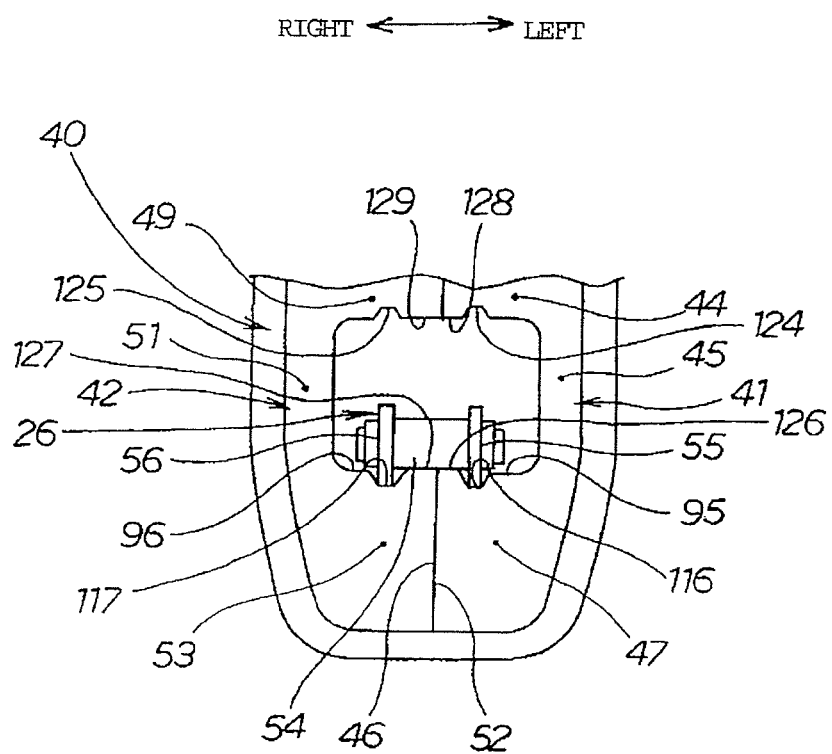
FIG. 13 illustrates a worn state of the chain guide body after the lapse of an operation time of the motorcycle.

As shown in FIG. 13, when the operation time of the motorcycle (symbol 10 in FIG. 1) elapses, the left-side upper surface 95 of the left-side lower wall 47 and the right-side upper surface 96 of the right-side lower wall 53 are worn due to the passage of the endless chain 26. Therefore, the left roller link plate 55 and the right roller link plate 56 do not make contact with the left-side lower split surface 46 and the right-side lower split surface 52, and, accordingly, wearing of the left-side lower split surface 46 and the right-side lower split surface 52 is restrained.

As the wearing proceeds, the left-side lower wall 47 and the right-side lower wall 53 are ground, and a left-side lower groove 116 and a right-side lower groove 117 are formed respectively in the left-side lower wall 47 and the right-side lower wall 53 along the longitudinal direction of the endless chain 26. Consequently, a left-side lower guide part 126 and a right-side lower guide part 127, which are in a projected form with the left-side lower split surface 46 and the right-side lower split surface 52 as a center, are formed at the lower wall between the left-side lower groove 116 and the right-side lower groove 117 and along the longitudinal direction of the endless chain 26.

By the passage of the rollers 54 on the left-side lower guide part 126 and the right-side lower guide part 127, movement of the endless chain 26 is restricted. Accordingly, wearing of the left-side upper wall 44, the left side wall 45, the left-side lower wall 47, the right-side upper wall 49, the right side wall 51 and the right-side lower wall 53 is restrained.

On the other hand, as wearing of the upper wall proceeds, a left-side upper groove 124 and a right-side upper wall 125 are formed in the left-side upper wall 44 and the right-side upper wall 49 along the longitudinal direction of the endless chain 26. In addition, a left-side upper guide part 128 and a right-side upper guide part 129, which are in a projected form with the left-side upper split surface 43 and the right-side upper split surface 48 as a center, are formed between the left-side upper groove 124 and the right-side upper groove 125 and along the longitudinal direction of the endless chain 26. Movement of the endless chain 26 is restricted by the passage of the rollers 54 on the left-side upper guide part 128 and the right-side upper guide part 129. Consequently, wearing of the left-side upper wall 44, the left side wall 45, the left-side lower wall 47, the right-side upper wall 49, the right side wall 51 and the right-side lower wall 53 is restrained, in the same manner as in the case where the lower wall is ground.

Meanwhile, the chain guide device 30, due to characteristic properties of the component parts thereof, suffers wearing of the upper wall and the lower wall of the chain guide body by the passage thereon of the endless chain. The chain guide device 30 is provided with a wear indicator as means for detecting the progress of this wearing. The structure and operation of the wear indicator will be described referring to FIG. 14.

Figure 14A:
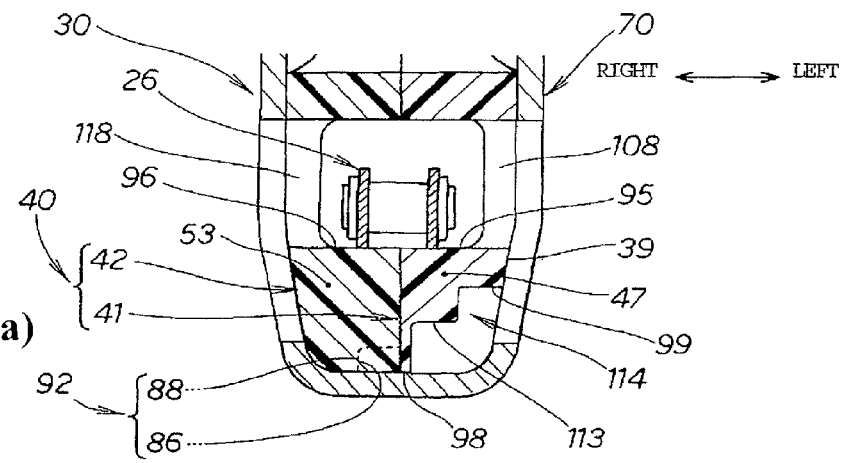
FIGS. 14(a) to 14(c) illustrate the structure and operation of a wear indicator.

FIG. 14(*a*) is a sectional view taken along line 14*a*-14*a* of FIG. 2. The left guide half 41 is provided with a wear indicator 114 for checking the wear of the left-side lower wall 47. The wear indicator 114 includes a hollow 99 provided in the range from the left-side outer side surface 39 to a left-side outer lower surface 98 of the left-side lower wall 47 and caving in to the inside of the left-side lower wall 47, and a step 113 disposed in the hollow 99 and being parallel to the left-side upper surface 95 of the left-side lower wall 47. The wear indicator 114 ensures that the timing for replacement of the chain guide body 40 can be visually confirmed when the endless chain 26 reaches the step 113 as a result of the wearing. The lower-side positioning part 92 for the left-side lower wall 47 is provided on the lower side relative to the step 113.

Figure 14B:
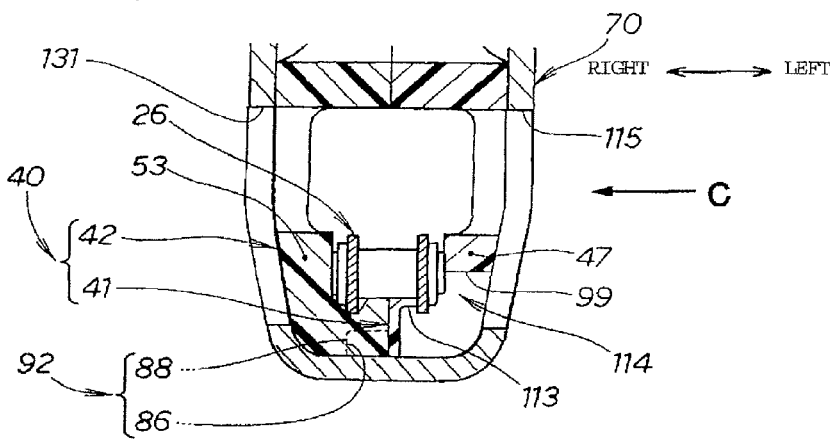

As the operation time of the endless chain 26 elapses, the left-side lower wall 47 and the right-side lower wall 53 are ground by the endless chain 26, with the result that the step 113 of the left-side lower wall 47 is ground away by the endless chain 26, as shown in FIG. 14(b).

Figure 14C:
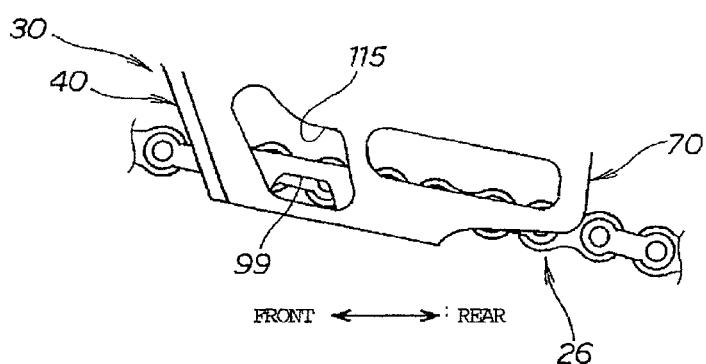

FIG. 14(c) is a view taken along arrow c of FIG. 14(b). When the endless chain 26 is viewed via a left-side front opening 115 in the chain guide bracket 70, the height of passage of the endless chain 26 is seen to have been lowered as compared with that in an initial condition. More specifically, as shown in FIG. 14(b), the lower-side positioning part 92 is provided on the lower side relative to the step 113, so that the timing for replacement of the chain guide body 40 can be confirmed visually and easily from the wear indicator 114 before the wearing of the left-side lower wall 47 reaches the lower-side positioning part 92.

In addition, while the wear indicator 114 has been provided in the left guide half 41 in the present example, it may be provided in the right guide half 42.

In addition, the chain drive type vehicle pertaining to the present invention has been applied to the motorcycle in the present embodiment, it is applicable also to bicycles, three-wheel vehicles and four-wheel vehicles, and may be applied to general vehicles.

Further, the driving force generating device pertaining to the present invention has been applied to an engine in the present embodiment, it may be applied also to electric motors.

In addition, while the wheel pertaining to the present invention has been applied to the rear wheel in the present embodiment, it may be applied to the front wheel in front drive type two-wheel vehicles, three-wheel vehicles and four-wheel vehicles.

The chain guide device according to the present invention is preferable for use in motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain guide device comprising:
an endless chain adapted to be wrapped around a driven sprocket and a drive sprocket;
an annular chain guide body for guiding the endless chain while surrounding a part in a longitudinal direction of the endless chain; and
a chain guide bracket adapted to be provided in a swing arm for holding the chain guide body;
said annular chain guide body being split into a left guide half and a right guide half including split surfaces along the longitudinal direction of the endless chain.

2. A chain guide device provided in a chain drive vehicle, comprising:
a driving force generating device provided on a main frame constituting a vehicle body,
a drive sprocket provided in the driving force generating device,
a swing arm mounted to the main frame in a vertically swingable manner,
a wheel provided on the swing arm in a rotatable manner,
a driven sprocket provided on the wheel, and an endless chain wrapped around the driven sprocket and the drive sprocket, with the wheel being rotated through a power transmitting action of the endless chain;
wherein the chain guide device comprises an annular chain guide body for guiding the endless chain while surrounding a part in a longitudinal direction of the endless chain, and a chain guide bracket provided in the swing arm and holding the chain guide body; and
the chain guide body is split into a left guide half and a right guide half which have split surfaces along the longitudinal direction of the endless chain.

3. The chain guide device according to claim 2, wherein a weight of the left guide half is equal to a weight of the right guide half, and the left and right guide halves are simultaneously molded using a single mold.

4. The chain guide device according to claim 2, wherein the endless chain comprises left and right roller link plates provided on left and right sides of rollers, interconnecting the rollers, and rotatably supporting the rollers; and
the split surfaces of the left and right guide halves are disposed between the left and right roller link plates when the endless chain is passed through the chain guide body.

5. The chain guide device according to claim 4, wherein the width between an inner wall surface of a left side wall and an inner wall surface of a right side wall is set wherein, when the endless chain is put in contact with the inner wall surface of one of the left or the right side wall of the chain guide body, the other side of the roller link plates is located astride the split surfaces.

6. The chain guide device according to claim 2,
wherein the left guide half of the chain guide body comprises an upper wall, a lower wall, and a left side wall, and
the right guide half of the chain guide body comprises an upper wall, a lower wall, and a right side wall;
the split surfaces are provided in each of the upper walls and the lower walls, and
the split surface of the upper wall and the lower wall of the left guide half is provided with a positioning part comprised of a projection, and the split surface of the upper wall and the lower wall of the right guide half is provided with a positioning part comprised of a recess.

7. The chain guide device according to claim 6, wherein the chain guide bracket is formed to be U-shaped in section for covering an outside surface of the chain guide body while being mounted to the swing arm through a support stay;
the left and right guide halves are respectively provided at front edges with flanges coming into contact with a front end of the chain guide bracket from a front side;
the left and right guide halves are respectively provided at upper portions with lock pieces engaged with one part of the support stay; and
the chain guide body is held by fixing the chain guide bracket to the support stay in a condition where the flanges are in contact with the chain guide bracket and where the lock pieces are pressed by the one part of the support stay.

8. The chain guide device according to claim 6, wherein the side wall of each of the left guide half and the right guide half is provided with lightening windows comprising:
slots in each of the side walls elongated in the longitudinal direction of the endless chain, and
a reinforcing beam provided for bridgingly interconnecting upper and lower edges of the lightening windows in each of the side walls; and the reinforcing beam is provided between the positioning part for the upper wall and the positioning part for the lower wall in each of the side walls, and is disposed on a line interconnecting the positioning part for the upper wall and the positioning part for the lower wall in each of the side walls, in side view.

9. The chain guide device according to claim 6, wherein the positioning part for the upper wall in each of the left and right guide halves is provided at lock piece base part formed in a thick form in the upper wall.

10. The chain guide device according to claim 6, wherein the recess of the lower wall of the right guide half is opened to a lower side of the lower wall, the projection of the lower wall of the left guide half is formed at the position of a bottom wall surface of the lower wall, and a lower surface of the projection of the left guide half is exposed from the recess of the right guide half when the left and right guide halves are put in contact with each other.

11. The chain guide device according to claim 6, wherein an outer side surface of each of the left and right guide halves is provided with lightening hole parts, which are recessed into the outer side surface of each of the left and right guide halves in a direction parallel to a projecting direction of the projection and the recess.

12. The chain guide device according to claim 6, wherein the chain guide body comprises:
- a wear indicator for confirming wear of the lower wall of the left guide half;
- the wear indicator comprises a hollow provided in a range from the outer side surface to an outer lower surface of the lower wall of the left guide half and caving in to an inside of the lower wall, and
- a step disposed in the hollow and being parallel to the upper surface of the lower wall of the left guide half, for ensuring that the timing for replacement of the chain guide body can be visually confirmed when the endless chain reaches the step due to wear; and the positioning part for the lower wall of the left guide half is provided on a lower side relative to the step.

13. The chain guide device according to claim 6, wherein a width of the recess of the positioning parts in the front-rear direction is set to be greater than a width of the projection of the positioning parts in a front-rear direction, whereby either the left guide half or the right guide half can be slid in the front-rear direction.

14. The chain guide device according to claim 6, wherein the upper walls and the lower walls of the chain guide body respectively comprise split parts formed along the longitudinal direction of the endless chain and a length of the split parts of the lower wall lower walls in the longitudinal direction is set to be greater than a length of the split parts of the upper walls in the longitudinal direction.

15. The chain guide device according to claim 14, wherein the chain guide bracket is formed to be U-shaped in section for covering an outside surface of the chain guide body while being mounted to the swing arm through a support stay;
- the left and right guide halves are respectively provided at front edges with flanges coming into contact with the front a front end of the chain guide bracket from a front side;
- the left and right guide halves are respectively provided at upper portions with lock pieces engaged with one part of the support stay; and
- the chain guide body is held by fixing the chain guide bracket to the support stay in a condition where the flanges are in contact with the chain guide bracket and where the lock pieces are pressed by the one part of the support stay.

16. The chain guide device according to claim 6, wherein the upper walls and the lower walls of the chain guide body respectively comprise split parts formed along the longitudinal direction of the endless chain and the positioning parts provided at the split surfaces of the lower walls are provided at rear portions of the split parts of the lower walls on an outlet side of the endless chain.

17. The chain guide device according to claim 16, wherein the chain guide bracket is formed to be U-shaped in section for covering an outside surface of the chain guide body while being mounted to the swing arm through a support stay;
- the left and right guide halves are respectively provided at front edges with flanges coming into contact with a front end of the chain guide bracket from a front side;
- the left and right guide halves are respectively provided at upper portions with lock pieces engaged with one part of the support stay; and
- the chain guide body is held by fixing the chain guide bracket to the support stay in a condition where the flanges are in contact with the chain guide bracket and where the lock pieces are pressed by the one part of the support stay.

18. The chain guide device according to claim 16, wherein the side wall of each of the left guide half and the right guide half is provided with lightening windows comprising:
- slots in each of the side walls elongated in the longitudinal direction of the endless chain, and
- a reinforcing beam provided for bridgingly interconnecting upper and lower edges of the lightening windows in each of the side walls; and
- the reinforcing beam is provided between the positioning part for the upper wall and the positioning part for the lower wall in each of the side walls, and is disposed on a line interconnecting the positioning part for the upper wall and the positioning part for the lower wall in each of the side walls, in side view.

19. The chain guide device according to claim 16, wherein the positioning part for the upper wall in each of the left and right guide halves is provided at lock piece base part formed in a thick form in the upper wall in each of the left and right guide halves.

20. The chain guide device according to claim 16, wherein the recess of the lower wall of the right guide half is opened to a lower side of the lower wall, the projection of the lower wall of the left guide half is formed at the position of a bottom wall surface of the lower wall, and a lower surface of the projection of the left guide half is exposed from the recess of the right guide half when the left and right guide halves are put in contact with each other.

* * * * *